Oct. 19, 1965   G. M. BAIGENT   3,212,821
METHOD OF INSPECTING ARTICLES AND APPARATUS THEREFOR
Filed Feb. 19, 1963
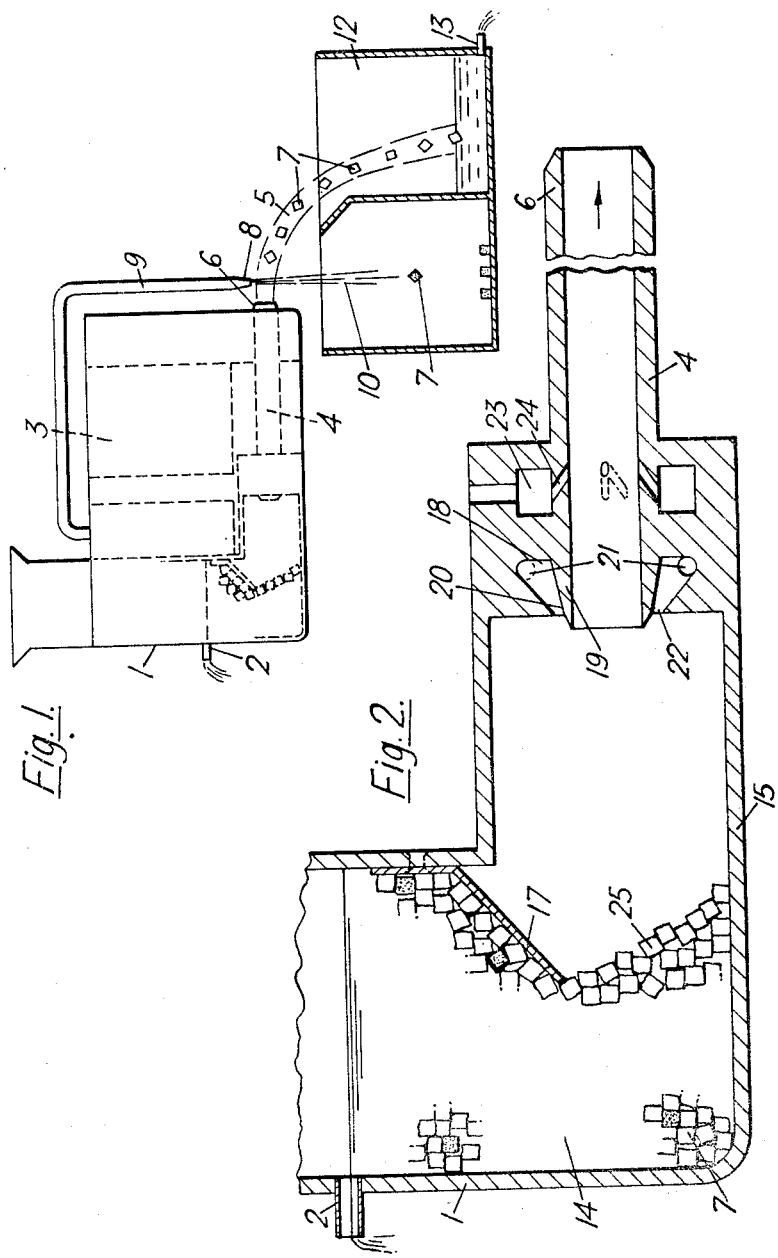
Inventor
George Mattey Baigent
By Wenderoth,
Lind and Ponack, Attorneys

United States Patent Office 3,212,821
Patented Oct. 19, 1965

3,212,821
METHOD OF INSPECTING ARTICLES AND APPARATUS THEREFOR
George Mattey Baigent, 13–15 Broadwater Road, Welwyn Garden City, Hertfordshire, England
Filed Feb. 19, 1963, Ser. No. 259,507
Claims priority, application Great Britain, Feb. 19, 1962, 6,383/62, 6,384/62
9 Claims. (Cl. 302—14)

This invention is for improvements in or relating to a method of inspecting articles and has for an object to facilitate the inspecting of soft or easily bruised articles and also cut fruit as well as articles whose surfaces may be such as to provide specular reflection of light or which, when moistened, produce the effect of specular reflection.

Various prior proposals exist for inspecting articles, some of which have involved conveying the articles to an inspection point by mechanical means, such as a conveyor belt, whilst other methods have involved inspecting the articles whilst they are in motion through the air and examples of this latter method as applied to the sorting of articles are the subject of my prior British Patents Nos. 712,113, 730,177 and 730,549.

An object of the present invention is to provide an improved method of inspecting articles, particularly adapted to the sorting, checking or counting of articles, amongst which may be particularly mentioned diced vegetables and diced fruit. With articles such as the diced vegetables and diced fruits, these are, on the one hand, easily bruised and, on the other hand, are liable to discoloration in contact with air; in both instances the surfaces of the articles are affected in a way which would influence the reflection of light from their surfaces. A further object of the invention is to provide a convenient form of apparatus for use in carrying out the method of this invention.

According to the present invention, there is provided a method of inspecting articles which comprises suspending the articles in a stream of fluid and directing the articles, whilst so suspended, one by one in a predetermined path past an inspection point and subjecting the articles to inspection at that point; preferably, the articles are suspended in a stream of water or other transparent liquid.

By suspending the articles in a stream of fluid, the soft and easily bruised articles are protected against damage by reason of contact with hard surfaces whilst, in the case of vegetables and fruits which are liable to discoloration when in contact with air, these articles can be suspended in a stream, for example of salt water which avoids staining of the diced fruit or vegetable.

The method of inspection above referred to is particularly applicable to the sorting of articles as above described, particularly for the purpose of ensuring that substandard diced portions of vegetable or fruit do not pass into the stream of such diced articles passing forward to a vegetable or fruit canning process. The sorting of the articles is preferably effected by means of an optical sensing device located at the inspection point, which optical sensing device is adapted to detect variations in the surface characteristics of the individual articles and, in addition, to actuate a sorting device to select or reject individual articles in accordance with their surface characteristics. The sensing device preferably comprises a photo-electric device and reference is made to my prior British patents for a more complete understanding of their method of sorting as a result of an optical inspection of the surfaces of the articles.

Whilst the optical sensing device may be arranged to inspect the articles from a plurality of directions simultaneously, the invention also includes as a feature that the articles in suspension in the stream of fluid are caused to rotate about the axis of the stream of fluid, for example by imparting to the stream of liquid a swirling motion. This is perhaps best achieved in accordance with a further feature of the invention by confining the stream of fluid over at least a part of the predetermined path in a tube.

It will be appreciated that the tube may be transparent, in which case the inspection point may be disposed around the said tube although it may equally well be disposed so as to surround the unconfined flowing stream of fluid.

In order to select or reject the individual articles as above referred to, they may be displaced out of the flowing stream of fluid by means of a controlled jet of fluid, e.g. air or water, so directed as to deflect the desired articles out of the general stream, the said jet being controlled by the optical sensing device.

It is to be understood that the present invention also includes within its scope the inspection of articles whilst they are air-aborne in a moving stream of air or other gas.

It will be appreciated that the invention is clearly distinguished from prior proposals in which the articles fall through still air by the underlying characteristics of the present invention involving the suspension of the articles in a moving stream of fluid.

Whilst reference has been made above to the inspection of the articles by means of a sensing device relying upon the optical characteristics of the articles, it is to be understood that the invention is not so limited but can be operated with the aid of sensing devices which are adapted to distinguish physical characteristics other than optical characteristics, such as capacitance, resistivity and magnetic properties.

The apparatus, for use in carrying out the method of the present invention as hereinbefore set forth, which this invention also includes, comprises a feeder device for feeding articles one by one to a predetermined discharge point comprising a hopper, a chamber connected to a side wall of the hopper to form a sideways extension thereof, a fluid inlet disposed in said chamber and a discharge tube in a side wall of said chamber. In the use of the feeder device, the fluid is introduced into said chamber to form a rapid stream which erodes individual articles from the erosion face (i.e. the free face) of the articles collected in the hopper, generally at the bottom of the hopper, and carries them out of the chamber through the discharge tube. The rate of flow of the fluid will be such as to cause the articles to be suspended in the fluid. In one form of the feeder device, the rate of fluid flow and the direction in which it is introduced into the chamber are such as to create conditions of turbulence thus enhancing the eroding effect upon the articles forming the erosion face of the articles in the hopper and facilitating the suspension of the articles in the fluid both in the chamber and in the discharge tube.

In a preferred embodiment of the feeder, the fluid inlet is constituted by a plurality of jets disposed around the end of the discharge tube so as to direct the fluid flow towards the said erosion face. In one form of construction, the jets are constituted by a single annular orifice formed by the end of said discharge tube in cooperation with an annular chamber into which the fluid inlet feeds.

According to a further feature of the invention, the annular orifice is formed to provide a convergent, rotating conical stream of fluid directed into the hopper in a direction coaxially of the discharge tube.

By the use of the feeder device as above referred to, the stream of fluid flowing into the chamber results in the production of a pressure head in the hopper and the turbulence set up by the effect of the velocity of the stream of fluid causes articles in the hopper to become suspended in the fluid and to be swept out of the discharge tube by the current of fluid flowing out of the hopper as a result of the said pressure head therein.

According to a further feature of the invention, the annular chamber disposed around the inlet end of the discharge tube to cooperate therewith forms an inwardly directed annular jet, said annular chamber being formed or provided with a fluid inlet so disposed as to produce a rotating flow of fluid within said chamber. It will be appreciated that the rotation of the fluid within the chamber ensures that the issuing conical stream is rotating and the rate of rotation and the conical angle will vary with the rate of input of fluid into the chamber, the particular dimensions of the inwardly directed annular jet also affecting the rate of rotation and the conical angle of the jet according to the well-known laws of hydraulics.

The feeder device of the present invention is capable of being used with articles of various densities since even if the articles are of a lower density than the liquid being used, the articles will be driven to the bottom part of the hopper merely by the effect of the weight of the articles deposited in the hopper.

In order to prevent the articles at the erosion face becoming too tightly packed so as to be incapable of being eroded therefrom by the effect of the turbulent fluid, it is desirable to provide a baffle extending into the hopper so as to provide for a reduced weight being superimposed on those articles in the neighborhood of the erosion face.

By providing the hopper with an overflow orifice there will be a constant pressure head of liquid at the level of the discharge tube provided that the input of liquid into the chamber is at least sufficient to ensure that the level of liquid in the hopper reaches the overflow; this constant pressure head of liquid results in a substantially constant rate of flow of the liquid through the discharge tube and this will ordinarily ensure that a substantially constant outlet velocity is maintained at the discharge point from the discharge tube.

Since the feeder mechanisms of this invention are used for feeding articles to an inspection point for the purposes of sorting, counting or inspecting, it may be desirable to be able to control or modify the spacing of the articles suspended in the stream of fluid flowing along the discharge tube and according to a further feature of the invention, therefore, there is provided a secondary flow of fluid into the said tube downstream of the inlet end thereof. The secondary flow of fluid is introduced into the discharge tube through inlets which may be disposed radially of the tube or may, alternatively, be disposed at an angle to the tube, preferably so as to introduce the secondary flow of fluid into the tube with a component of movement along the direction of flow of the primary fluid; by so disposing the inlets as to have a tangential entry into the tube, the body of fluid flowing along the tube is induced to have a rotating motion so that articles being carried in suspension along the tube are caused to rotate. This latter arrangement is of particular value when the feeder device is associated with sensing devices employed to inspect the articles with a view to operating a selecting or rejecting mechanism for the purpose of sorting.

The invention will be better understood by a consideration of the following description of the method and apparatus given with reference to the following drawings in which:

FIGURE 1 is a diagrammatic representation of the apparatus in which there is carried out the method of inspecting articles, and FIGURE 2 is a cross-section of the lower part of the hopper of FIGURE 1.

Referring first to FIGURE 1, it will be seen that there is provided a hopper 1 having an overflow pipe 2 in a side wall thereof, the hopper being associated with an inspection and control assembly, generally indicated at 3, in which there are housed means for pumping the liquid (not shown), means for inspecting the articles (not shown) and control means (not shown) for operating mechanism for the selection or rejection of articles in accordance with some characteristic thereof detected by a sensing device associated with the means for inspecting the articles. It is to be understood that the pumping means, inspecting means, sensing means and control means do not in themselves form a part of the present invention and any convenient form of the several means known in the prior art for the inspection and sorting of articles may be employed in the carrying out of the method of the present invention which, as pointed out above, is concerned with the improvement of prior methods by the new technique of carrying the articles to be inspected past an inspection point whilst in suspension in a stream of fluid.

The hopper 1 is connected to a discharge tube 4 through which the articles fed into the hopper are carried in suspension in a stream of liquid which issues as a jet 5 from the outlet end 6 of the tube 4, the suspended articles being indicated at 7. Adjacent the outlet end 6 of the tube, there is disposed an ejector jet 8 mounted upon a feed pipe 9 through which liquid is pumped when the control means is activated by the sensing means so that a transverse jet of liquid 10 is momentarily ejected so as to deflect from the liquid stream 5 any article 7 which has been found by the sensing means to be substandard. The deflected articles are collected in a receptacle 11 whilst the undeflected articles are carried by the jet 5 into a receptacle 12 having a drain pipe 13 for liquid accumulating therein, the liquid draining off through pipe 13 being recycled if desired back to the hopper 1.

In FIGURE 2 there is seen in cross-section, the lower part of the hopper 1 of FIGURE 1 showing the internal construction of that part of one embodiment of apparatus according to the present invention which provides many of the desirable effects obtainable with the method of the invention.

In this specific embodiment of feeder device in accordance with the present invention there is provided a hopper 1 which at the bottom 14 is provided with an extension 15 in the form of a chamber 16 extending horizontally therefrom, which chamber is cylindrical in cross-section. Formed on or mounted in the vertical portion of the hopper 1 adjacent to the entry into the horizontal chamber 16 is a downardly-inclined baffle member 17 extending towards the middle of the hopper.

At any desired height in the hopper 1 there is provided an overflow 2, the position of the overflow determining the hydrostatic head at the base of the hopper during use.

In the end of the cylindrical chamber 16 at the base 14 of the hopper there is mounted a discharge tube 4, which tube is surrounded by an annular chamber 18 which, by cooperating with the inlet end 19 of the said tube 4, provides an annulus 22, the shaping of the walls of the annular chamber 18 forming, with a tapered exterior surface 20 of the tube 4, a rearwardly directed cone-shaped hollow chamber.

Feeding into the chamber there are provided one or more tangential inlet tubes 21 so that when in operation, a rotating body of fluid is formed within the annular chamber 18 and issues through the annulus 22 in the form of a rotating conical jet indicated by the arrows in FIGURE 2.

Also associated with the discharge tube 4 is another annular chamber 23 communicating with the interior of the tube by means of a plurality of inclined passages 24 which are inclined in the direction of flow of the fluid passing along the discharge tube 4. The inclined passages 24 may be tangential in respect of the axis of the tube if it is desired to ensure rotation of the stream of fluid passing along the tube 4, an arrangement which is desirable in some circumstances in order to ensure that articles passing along the tube are caused to rotate. The two annular chambers 18 and 23 above referred to may be formed as a single constructional element for association with the discharge tube 4 or may be constituted by separate structures mounted upon the above-mentioned tube.

In operation of the device of the invention for the feeding of diced vegetables, water is supplied to the two annular chambers 18 and 23, as a result of which water flows into the hopper 1 and rises therein to the level of the overflow 2.

The diced vegetables to be fed are tipped into the open top of the hopper 1 and although in the case, for example, of diced turnips the diced portions of turnip would tend to float, the hopper can be filled down to the bottom by reason of the fact that the weight of a mass of diced turnips in the top part of the hopper would force the lower levels of the diced turnips down to the bottom of the hopper. At the bottom of the hopper, the diced turnips will extend beyond the lip of the baffle 17 to form an inclined face 25, hereinbefore referred to as an erosion face, having its free face directed towards the inlet end 19 of the tube 4. By reason of the velocity of the jet of water issuing from the annular chamber 18 surrounding the inlet end 19 of the tube 4 a considerable turbulence is set up in the cylindrical chamber 16 and this turbulence erodes the individual diced portions from the erosion face 25 and the turbulence in that part of the device coupled with the outflow of water through the discharge tube 4 causes the diced portions of turnip to remain in suspension in the water and to be passed down through the centre of the tube 4 without undergoing any substantial physical contact with any of the walls of either the cylindrical chamber 16 or the discharge tube 4.

Although the foregoing description has been given with reference to the use of water in the feeding of diced turnips, it will be understood that the invention is not so limited and envisages the use of any suitable fluid for the feeding of a wide variety of articles including powdered materials such as flour, small particles such as tea-leaves and small seeds, pieces of synthetic resin and larger seeds such as fresh peas.

The rate of feed both as regards the number of articles per second and their rate of movement in the stream can be varied widely by appropriate dimensioning of the parts of the apparatus and by control of the rate of feed of the fluid to the device.

When the feeder device of the present invention is operated by means of a gas flow, it will be understood that an adeqaute flow of gas out through the discharge tube can be ensured by the use of a sufficient depth of articles in the hopper to produce the necessary resistance to gas flow therethrough.

I claim:

1. A method of sorting articles which are soft and easily bruised, such as diced fruits and vegetables, comprising heaping articles which are soft and easily bruised and which have a natural angle of repose when they are heaped and which are to be sorted to provide an erosion face on the heap of articles with the erosion face at a substantially natural angle of repose for the articles, directing a stream of fluid against said erosion face in a substantially horizontal direction to dislodge individual articles from the said erosion face of the heap of articles separately from each other, conducting the fluid away from the erosion face in a narrow stream with the articles suspended in the stream and along the stream in positions spaced from each other in the direction of flow of the stream, inspecting the spaced individual articles as they pass a point along the length of the stream, and acting on individual articles while they are still suspended in said stream at a point downstream of said inspection point for removing the articles from the stream when certain predetermined characteristics are detected in the inspection.

2. Apparatus for carrying out a method of feeding articles one by one in a fluid stream for inspecting and sorting, said apparatus comprising a vertically positioned hopper having a side wall with an opening therein opening substantially horizontally of the hopper, a substantially horizontally extending chamber connected to the side wall of the hopper over said opening and into which said opening opens to form a sideways extension of said hopper, a fluid inlet means disposed in said chamber for admitting a fluid stream into said chamber and directing it substantially horizontally into said opening, and a substantially horizontally extending discharge tube in a side wall of said chamber spaced from said opening in the side wall of said hopper.

3. Apparatus as claimed in claim 2 in which said fluid inlet means comprises a wall of said chamber opposite said opening having an annular orifice therein, said discharge tube opening out of said chamber within said annular orifice.

4. Apparatus according to claim 2 wherein said discharge tube has a secondary fluid inlet therein downstream of the inlet end thereof.

5. Apparatus according to claim 4 wherein said secondly fluid inlet is disposed tanqentially of the tube.

6. Apparatus as claimed in claim 3 in which the surfaces of said chamber wall defining said annular orifice converge to produce a convergent annular stream of fluid directed into said chamber coaxially of said discharge tube.

7. Apparatus as claimed in claim 3 in which said annular orifice has inlet openings thereon directed tangentially of said orifice for producing a rotating flow of the fluid as it exits from the annular orifice into said chamber.

8. An apparatus as claimed in claim 7 wherein said discharge tube has a secondary fluid inlet therein downstream of the inlet end thereof, which secondary fluid inlet is disposed tangentially of the tube.

9. A method of sorting articles which are soft and easily bruised, such as diced fruits and vegetables, comprising heaping articles which are soft and easily bruised and which have a natural angle of repose when they are heaped and which are to be sorted to provide an erosion face on the heap of articles with the erosion face at a substantially natural angle of repose for the articles, directing a stream of fluid against said erosion face in a substantially horizontal direction to dislodge individual articles from the said erosion face of the heap of articles separately from each other, conducting the fluid away from the erosion face in a narrow stream with the articles suspended in the stream and along the stream in positions spaced from each other in the direction of flow of the stream, rotating said narrow stream of fluid about the axis along which it is flowing, inspecting the spaced individual articles as they pass a point along the length of the stream, and acting on individual articles while they are still suspended in said stream at a point downstream of said inspection point for removing the articles from the stream when certain predetermined characteristics are detected in the inspection.

References Cited by the Examiner
UNITED STATES PATENTS

| | | | |
|---|---|---|---|
| 1,908,220 | 5/33 | Chapman | 302—15 |
| 2,835,536 | 5/58 | Christille | 302—14 |
| 3,011,634 | 12/61 | Hutter | 209—111.5 X |
| 3,049,232 | 8/62 | Johnston | 209—111.5 |

ROBERT B. REEVES, *Primary Examiner.*